United States Patent [19]

Chen

[11] 4,172,329
[45] Oct. 30, 1979

[54] MULTI-FUNCTION TAPE RECORDER HAVING AUTOMATIC TIMING AND SIGNALLING SYSTEM FOR TRAINING PURPOSE

[76] Inventor: Shih-Chiao Chen, No. 8, Alley 20, Lane 373, Ching Hsin St., Chung Ho Hsiang, Taipei county, Taiwan

[21] Appl. No.: 813,373

[22] Filed: Jul. 6, 1977

[51] Int. Cl.² .............................................. G09B 19/06
[52] U.S. Cl. ....................................... 35/35 C; 35/8 A
[58] Field of Search ...................... 35/8 A, 9 A, 35 C; 179/1 VC; 360/62, 69

[56] References Cited

U.S. PATENT DOCUMENTS

| | | | |
|---|---|---|---|
| 3,405,238 | 10/1968 | Hurvitz | 35/35 C X |
| 3,495,337 | 2/1970 | Meyer et al. | 35/35 C |
| 3,550,289 | 12/1970 | Orita et al. | 35/35 C |
| 3,571,524 | 3/1971 | Kozu et al. | 35/35 C X |
| 3,641,507 | 2/1972 | Kosaka et al. | 35/35 C |
| 3,683,515 | 8/1972 | Kosaka | 35/35 C |
| 3,702,506 | 11/1972 | Goshima et al. | 35/35 C |

FOREIGN PATENT DOCUMENTS

| | | | |
|---|---|---|---|
| 2422516 | 10/1975 | Fed. Rep. of Germany | 35/35 C |
| 766434 | 1/1957 | United Kingdom | 35/35 C |

*Primary Examiner*—Vance Y. Hum
*Attorney, Agent, or Firm*—Ladas, Parry, Von Gehr, Goldsmith & Deschamps

[57] ABSTRACT

A tape recorder for instructional purposes comprises a timing and signalling circuit which responds to the giving of instruction by illuminating an LED on termination of the instruction for a period equal to the duration of the interval between commencement of the instruction and illumination of the LED.

4 Claims, 4 Drawing Figures

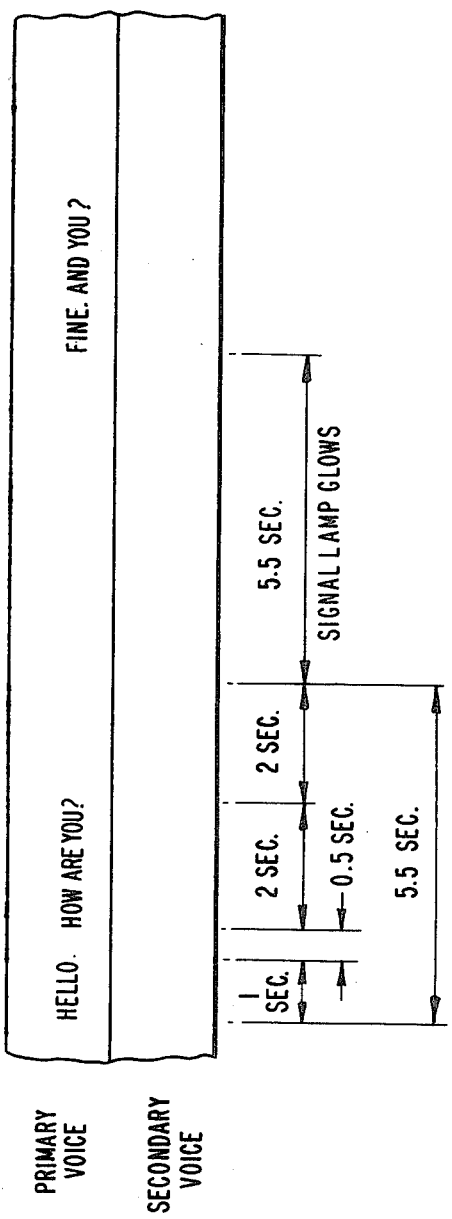

MULTI-FUNCTION TAPE RECORDER HAVING AUTOMATIC TIMING AND SIGNALLING SYSTEM FOR TRAINING PURPOSE

This invention relates to a multi-function tape recorder for training purposes and particularly to an automatic timing and signalling system incorporated therein.

A conventional tape recorder can only be used either for recording or for playback. In other words, it cannot be operated to record and playback simultaneously. In particular, after the entire tape has been used to record, the information recorded must be erased in order that the tape can be used again for recording. Therefore, when conventional tape recorders are used for training purposes, a student can either listen to the teacher's voice being played back from the tape or proceed with recording his own recitation, and it is impossible for the student to make an analytic comparison between the teacher's voice (hereinafter referred as the primary voice) and his own voice (hereinafter referred as the secondary voice) so as to appreciate the progress of learning. Furthermore, the teacher has to silently repeat the words previously delivered when recording his instructions for the purpose of reserving a length of unrecorded track on the tape for the student. Accordingly, the teacher cannot devote himself to the preparation of the subsequent instruction because he is distracted by calculating the duration of the interval corresponding to the length of unrecorded track. Since the procedures for operating and controlling conventional tape recorders are complicated, the progress of learning is considerably affected. In order to provide for simultaneous recording and playback using conventional tape recorders, at least two sets of tape recorders are required in the classroom and therefore the cost for training facilities is increased.

In view of the drawbacks of the conventional tape recorder, the inventor has developed a tape recorder which can be used not only for efficient training but also for amusement purpose. In the recorder of such a type, an automatic timing and signalling system is provided to automatically calculate the duration of a section of the teacher's oral instructions and to indicate with a signal of continuous red light the space on the tape (corresponding to the length of time used for recording the said primary voice) reserved for recording the secondary voice. Thus, neither the the teacher nor the student need worry about the time which they have used for recording. By use of such a system, the teacher and student can devote themselves to teaching and learning respectively, and therefore, the efficiency of training will be much increased. Another advantage of such a recorder is that it can be used for recording the secondary voice while the primary voice is being played back with proper volume but the students need not put on earphones to listen to the primary voice. This is because magnetic heads with better isolation quality are used in the circuitry to reduce cross interference resulting from the primary voice recording. Furthermore, the tape recorder of the present invention can save the teacher's labor for repeatedly recording his instructions as the primary voice can be kept on the tape as long as required. These advantages make the said tape recorder particularly suitable for training.

In addition, the tape recorder of the present invention has the following features:

1. It can be used for general purposes just like a conventional tape recorder.
2. There are clearly separated tracks on the tape and the tracks on either side of the tape can be simultaneously used for recording and playback so that the efficiency of the tape recorder is increased.
3. Compact structure and small dimension make it portable.
4. It has low cost of production.

FIG. 4 illustrates diagrammatically a recording made using the tape recorder of the invention.

Figure 1:
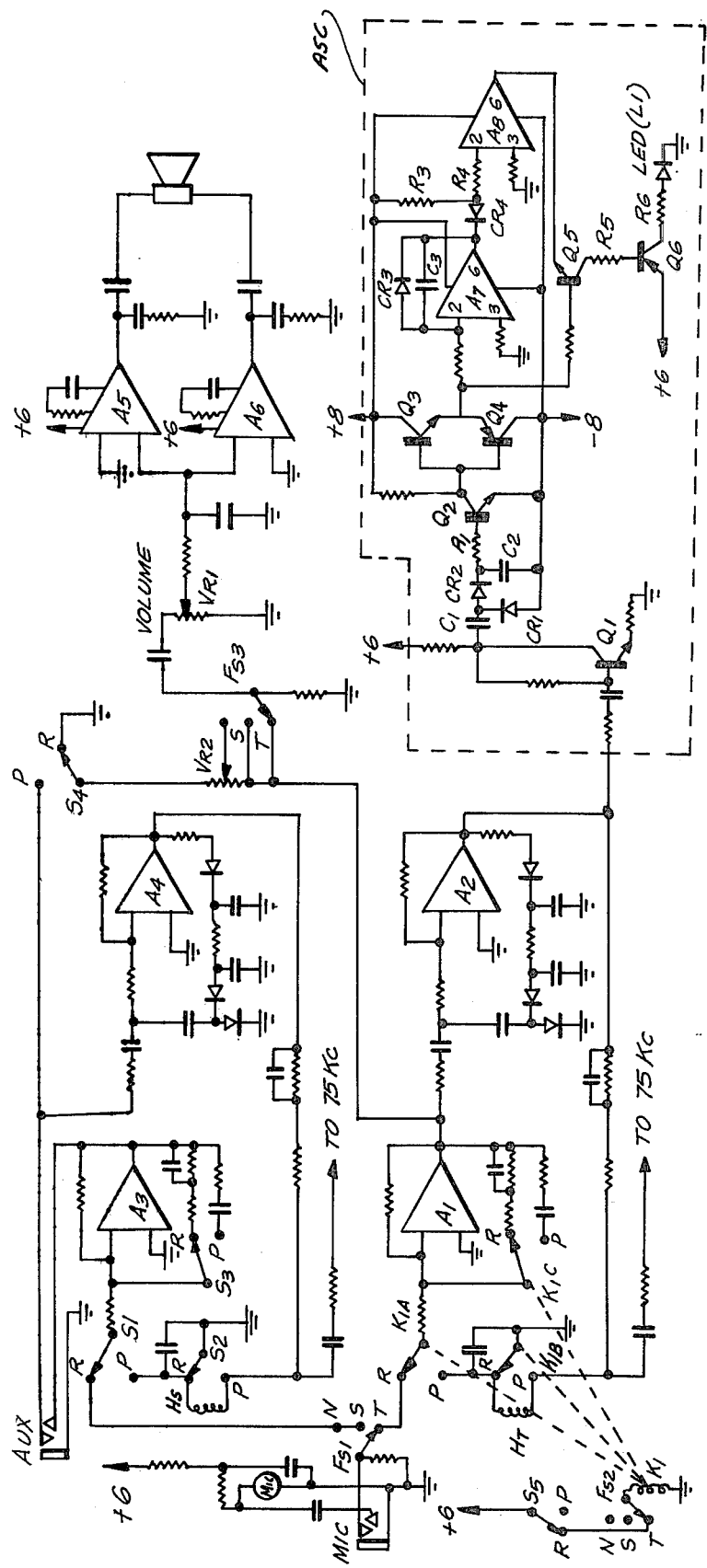
FIG. 1 shows the circuitry specially designed for the tape recorder of the invention, including the automatic space circuit and the audio output amplifier circuit.
Figure 3:
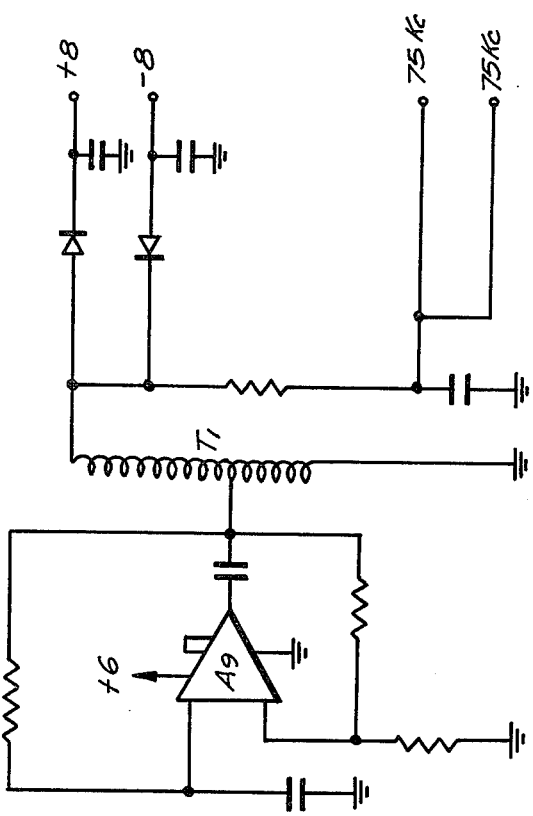
FIG. 3 is a schematic diagram of the converter device.
Figure 2:
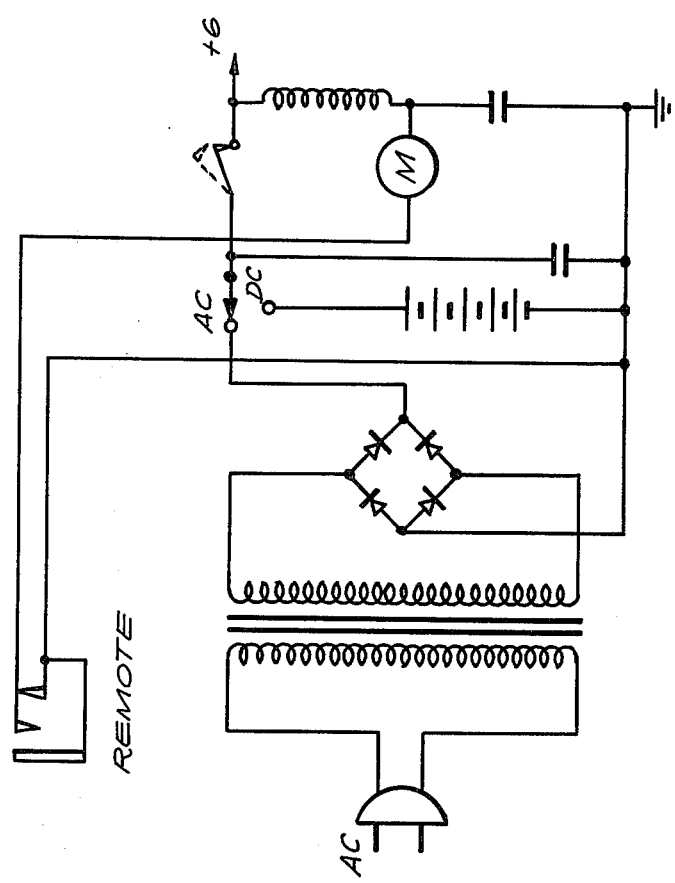
FIG. 2 is a schematic diagram of the power supply device together with its switches.

Referring to FIG. 1 of the drawings, the electrical signal of primary voice produced by a microphone MIC is applied to amplifier $A_1$ through the fixed contact T of a function switch FS1 and the fixed contact R of relay K1A, and the amplified signal from the amplifier $A_1$ is applied to amplifier $A_2$. The output of amplifier $A_2$ is applied to both recording head H T and auto space circuit ASC.

The auto space circuit ASC comprises a transistor $Q_1$ which amplifies the output signal from amplifier $A_2$. The signal developed at the collector of the transistor $Q_1$ is rectified by capacitors $C_1$, $C_2$ and diodes $CR_1$, $CR_2$ and is applied to the base of transistor $Q_2$. If transistor $Q_1$ does not receive an input signal, transistor $Q_2$ remains off and the common emitter voltage of transistors $Q_3$ and $Q_4$ is about $+8$ v, which is applied to an integrated circuit ($A_7$, $C_3$, $CR_3$ and $CR_4$). The output of the integrated circuit is about $-0.7$ v. The output voltage of $-0.7$ v. is applied to the connection point of resistors $R_3$ and $R_4$ and results in a small negative voltage, for example $-0.01$ v., being applied to an amplifier $A_8$. This voltage is then inverted and amplified by $A_8$ to about $+8$ V and is applied to the emitter of transistor $Q_5$. Since the base of $Q_5$ is connected to the common emitter of $Q_3$ and $Q_4$, the emitter and base of $Q_5$ are both at $+8$ V and therefore transistor $Q_5$ will not conduct. The transistor $Q_6$ does not conduct, and no current will pass through $R_6$. Accordingly, the signal lamp constituted by the light emitting diode $L_1$ will not glow.

If transistor $Q_1$ receives an audio signal input, $Q_2$ will conduct and the voltage at the common emitter of $Q_3$ and $Q_4$ will be $-8$ V. At the same time, the output of the integrated circuit begins to increase and finally becomes a positive voltage. However, such a voltage is inverted by $A_8$ to $-8$ V. Again, transistor $Q_5$ receives equal base and emitter voltages of $-8$ V, and will not conduct. Accordingly, transistor $Q_6$ will not conduct and the signal lamp $L_1$ will not glow. Capacitor $C_2$ is charged to a voltage that depends on the time for which the audio signal input was received by the transistor $Q_1$. If the audio signal input is discontinued, the positive voltage on capacitor $C_2$ will discharge through $R_1$ and therefore transistor $Q_2$ continues to conduct for a period of two seconds, and consequently the transistor $Q_2$ ceases to conduct only when the audio signal input is not received for a period of more than two seconds.

However, when the audio signal disappears, the voltage at the common emitter of $Q_3$ and $Q_4$ becomes $+8$ V. This causes $Q_5$ to conduct and in turn $Q_6$ conducts. As a result, the signal lamp glows until the voltage at the output of the integrated circuit goes negative, causing the output of $A_8$ to increase to +8 V, thus cutting off $Q_5$. The time taken for the output of the integrated circuit to go negative depends on the voltage to which the capacitor $C_3$ was charged and the discharge time constant of the circuit containing capacitor $C_3$. The discharge time constant may be made equal to the charge time constant, so that the time taken for capacitor $C_3$ to discharge is equal to the time previously taken for charging the capacitor. In this manner, the function of auto spacing for the secondary voice is achieved. The operation of the auto spacing feature will be described with reference to FIG. 4: The teacher delivers the passage "Hello. How are you?", and this is recorded on one track of the tape. The LED L1 is not illuminated during the teacher's delivery because the transistor $Q_6$ is held off by $Q_5$, as explained above. Even in the interval of 0.5 sec. between "Hello." and "How are you?" the transistor $Q_6$ remains off, by virtue of the capacitor $C_2$ discharging and holding the transistor $Q_2$ on. At the end of the teacher's delivery the transistor $Q_6$ remains off for a further 2 seconds, while the capacitor $C_2$ discharges, and then the transistor $Q_6$ turns on and the LED L1 is illuminated and remains illuminated for the duration of the teacher's delivery plus 2 seconds, to indicate the space reserved on the tape for recording the student's recitation. During the interval while the LED is illuminated the teacher can devote himself to the preparation of the next passage "Fine. And you?", and is not distracted by silently repeating the previously delivered passage for the purpose of calculating the amount of time which should be reserved for the student's recitation. When the LED L1 is extinguished, the teacher delivers the next sentence. Since the teacher's voice and the student's voice are not recorded on the same track of tape, the teacher and student need not worry about the condition of the tape. In particular, the teacher and student can observe the progress of learning by placing the function switch at the contact N for normal operation.

In order to achieve simultaneous playback of the primary voice and recording of the secondary voice, function switch FS1 (including FS2 and FS3) is switched to engage the contact S for recording the secondary voice received by the microphone MIC and amplified by amplifier $A_3$. Relay $K_1$ is not actuated and K1A K1B and K1C are at Position P. The signal from recording head HT is amplified by amplifier $A_1$ and applied to power amplifiers $A_5$ and $A_6$ through FS3 and VR1 and then to the loudspeaker. This completes the circuits to play back the primary voice.

By placing all the relevant switches to the positions for recording, the audio signal from MIC will be applied to amplifier $A_3$ through the contact S of the function switch FS1 and the contact R of $S_1$. The output of amplifier $A_3$ is amplified by amplifier $A_4$ and then applied to recording head HS to accomplish the secondary voice recording.

For general purpose recording and playback, the procedure as set forth in the immediately preceding paragraph is followed. If the recorded signals are simultaneously applied to the balance regulator VR2 for normal operation, the primary voice and the secondary voice can be played back at the same time and the volume of either of these two voices can be adjusted to facilitate training.

What I claim is:

1. Recording and reproducing apparatus, comprising drive means for transporting a recording member having first and second recording tracks past a recording and reproducing location, first and second audio signal input devices, recording and reproducing head means at said recording and reproducing location for recording on said first and second recording tracks audio signals provided respectively by said first and second audio signal input devices and for reproducing an audio signal recorded on at least one of said first and second tracks, and a timing and signalling circuit connected to the first audio signal input device to produce, after termination of an audio signal provided by said first audio signal input device, a visible signal for a duration substantially equal to the interval between commencement of said audio signal and commencement of said visible signal, said timing and signalling circuit comprising a first storage device which is charged during recording of an audio signal on the first recording track, trigger means connected to the first storage device and generating an output signal of a first voltage while the first storage device is in a charged condition and an output signal of a second voltage while the first storage device is in a discharged condition, a second storage device connected to receive the output signal of the trigger means to be charged when the trigger means generates said first voltage and to discharge when the trigger means generates said second voltage, the discharge time constant of the second storage device being substantially equal to the charge time constant thereof, and output means connected to the trigger means and to the second storage device and effective to cause production of said visible signal when, but only when, the output signal of the trigger means is at said second voltage and the second storage device is discharging.

2. Apparatus as claimed in claim 1, comprising an audio signal output device, and function switch means having a first condition in which it connects the first audio signal input device to the recording and reproducing head means, for recording an audio signal provided by said first audio signal input device on said first recording track, and a second condition in which it connects the recording and reproducing head means to the audio signal output device for reproduction of signals recorded on said first track and also connects the second audio signal input device to the recording and reproducing head means for recording an audio signal provided by said second audio signal input device on said second recording track, whereby the recording and reproducing head means both records on said second track and reproduces from said first track when the function switch means is in its second condition.

3. Apparatus as claimed in claim 2, wherein the function switch means has a third condition in which it connects the recording and reproducing head means to the audio signal output device for reproduction of signals recorded on said first track and on said second track.

4. Apparatus as claimed in claim 3, comprising amplifier means for amplifying the signals reproduced from the first and second tracks, the amplification of the signal reproduced from one of the tracks being variable independently of the amplification of of the signal reproduced from the other track.

* * * * *